(12) United States Patent
Uchida

(10) Patent No.: US 6,726,349 B2
(45) Date of Patent: Apr. 27, 2004

(54) VEHICLE LIGHTING APPARATUS

(75) Inventor: Hideki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/138,285

(22) Filed: May 3, 2002

(65) Prior Publication Data

US 2002/0163795 A1 Nov. 7, 2002

(30) Foreign Application Priority Data

May 7, 2001 (JP) ..................................... P2001-135901

(51) Int. Cl.[7] ................................................. B60Q 1/06
(52) U.S. Cl. ........................... 362/466; 362/464; 362/37
(58) Field of Search ................................ 362/464, 465, 362/466, 37, 40, 43, 276; 315/81, 82

(56) References Cited

U.S. PATENT DOCUMENTS

| | | | |
|---|---|---|---|
| 4,663,696 A | 5/1987 | Miyazawa et al. | 362/80 |
| 4,733,333 A | 3/1988 | Shibata et al. | 362/40 |
| 5,896,085 A | * 4/1999 | Mori et al. | 362/464 |
| 5,909,949 A | * 6/1999 | Gotoh | 362/37 |
| 6,010,237 A | * 1/2000 | Gotou | 362/460 |
| 6,049,749 A | * 4/2000 | Kobayashi | 362/37 |
| 6,481,876 B2 | * 11/2002 | Hayami et al. | 362/464 |

FOREIGN PATENT DOCUMENTS

| | | |
|---|---|---|
| DE | 197 56 574 A1 | 10/1998 |
| DE | 198 15 414 C2 | 10/1998 |
| DE | 100 07 984 A1 | 11/2000 |
| JP | 2001-105965 | 4/2001 |

\* cited by examiner

*Primary Examiner*—Thomas M. Sember
(74) *Attorney, Agent, or Firm*—Fish & Richardson P.C.

(57) ABSTRACT

A vehicle lighting apparatus includes means for controlling a deflection angle of a lamp which controls the deflection angle based on an output from a steering angle sensor for detecting the steering direction. The maximum deflection angle is controlled based on a vehicle speed detected by a vehicle speed sensor. When the vehicle is almost in a state of coming to stop, the maximum deflection angle is set to 0°, and the direction of radiation of the lamp is fixed in the straight ahead direction of the vehicle. When the vehicle is in the state of cruising almost at a high speed, the maximum deflection angle is suppressed with increase in vehicle speed, and thus the deflection angle of the lamp is controlled within the angle range around the straight ahead direction, thereby preventing lateral fluctuation of the deflecting direction of the lamp.

4 Claims, 11 Drawing Sheets

VEHICLE LIGHTING APPARATUS

BACKGROUND OF THE INVENTION

1. Field of the Invention

The present invention relates to a vehicle lighting apparatus such as motor vehicles, and more specifically, to a vehicle lighting apparatus comprising means for controlling deflection angle of a lamp for varying the direction of radiation of beam of light corresponding to the traveling conditions, for example, an adaptive front-lighting system (hereinafter referred to as AFS) for vehicles, wherein a correct direction of radiation corresponding to variations in vehicle speed can be set.

2. Description of the Related Art

The AFS proposed for enhancing driving safety of motor vehicles detects information on the steering angle of the steering wheel SW of the motor vehicles, the vehicle speed, and other traveling conditions of the motor vehicles by the sensor 1, and the detected output is input to the electronic control unit 2 (hereinafter referred to as ECU) as shown in FIG. 1. The ECU 2 controls the swivel type lights 3R, 3L provided respectively on the left and right of the front portion of the motor vehicle, that is, the headlamps 3 that the direction of radiation can be deflected in the lateral direction based on the supplied sensor outputs. Such a headlamp may include, as a structure that can turn the reflector provided in the headlamp in the horizontal direction, a structure that can turn the reflector by the driving source such as a motor or the like. A mechanism for this turning is referred to as an actuator in this specification. According to the AFS in this type, when the motor vehicle travels on the curved road, the portion of the road ahead of the curve may be illuminated corresponding to the traveling speed of the motor vehicle, thereby effective in improving driving safety.

However, in the AFS of this type, it is normally preferable to illuminate the area immediately in front of the motor vehicle during travel at a low speed, and to illuminate the front area at a corresponding distance during travel at high speeds. However, in the AFS in the related art, the maximum deflection angle of the direction of radiation is not specially considered, and the maximum deflection angle of the headlamp is uniquely defined, for example, by the steering angle of the steering wheel during travel both at low speeds and at high speeds. Therefore, if the AFS is set to illuminate correctly at the area immediately in front of the motor vehicle during travel at low speeds when the steering wheel is turned by a prescribed angle, the area that is significantly laterally misaligned with the area at a corresponding distance in the traveling direction of the motor vehicle is illuminated during travel at high speeds, which disables the correct illumination by the AFS. Especially, significant change in the direction of radiation during travel at high speeds, during which the steering wheel is to be turned little by little, causes a problem in traffic safety. In contrast to it, when the AFS is set to illuminate correctly during travel at high speeds, it cannot illuminate the area immediately in front of the motor vehicle correctly in the traveling direction on the curved road during travel at low speeds.

When the AFS is activated by turning the steering wheel steeply while the motor vehicle is moving at speeds as low as crawling or coming to stop, especially when parking the motor vehicle in the parking area or putting it in the garage, the direction of radiation of the headlamp is deflected significantly in the lateral direction, and thus the area immediately in front of the motor vehicle in the traveling direction cannot be illuminated, which leads to the unfavorable conditions in terms of the safety confirmation. In addition, a large deflection of the direction of radiation of the headlamp in a state in which the motor vehicle is almost coming to stop is unpleasant for the occupant, and there may be a case in which it dazzles motor vehicles or pedestrians passing nearby, which may be unfavorable in terms of traffic safety.

SUMMARY OF THE INVENTION

It is an object of the present invention to provide a vehicle lighting apparatus adapted to illuminate correctly following the vehicle speeds.

According to the present invention, there is provided a vehicle lighting apparatus comprising lamp deflection angle controlling means which includes a steering angle sensor for detecting the steering direction of the vehicle and controls changes of the deflection angle of the direction of radiation of a lamp based on the output from the steering angle sensor, characterized in that there is provided a vehicle speed sensor for detecting the traveling speed of the vehicle and the lamp deflection angle controlling means is adapted to control the maximum deflection angle of the lamp based on the vehicle speed detected by the vehicle speed sensor. The lamp deflection angle controlling means is adapted in such a manner that the maximum deflection angle is 0° when the vehicle is almost in a state of coming to stop and the maximum deflection angle decreases with increase in vehicle speed when the vehicle is in a cruising state at least at a prescribed speed. Further, the lamp deflection angle controlling means is preferably constructed so that the maximum deflection angle increases with increase in vehicle speed when the vehicle is in the transitional traveling state between the state of almost coming to stop and the cruising state.

According to the present invention, when the vehicle is in the state of almost coming to stop, by setting the maximum deflection angle of the lamp to 0°, the direction of radiation of the lamp is fixed in the straight ahead direction at the time of crawling, or being halted or parked, or at the time of putting the vehicle into a garage. Therefore, the adjacent area of the motor vehicle may be illuminated stably to prevent the motor vehicles or pedestrians passing nearby from being dazzled, and unpleasant feeling due to a large deflection of the direction of radiation of the headlamp may be prevented. When the vehicle is in the state of cruising almost at a high speed, the maximum deflection angle is suppressed with increase in vehicle speed, and thus the deflection angle of the lamp is controlled within the angle range around the straight ahead direction so that the area around the straight ahead direction at a corresponding distance in the traveling direction can be illuminated irrespective of the steering state of the vehicle, thereby preventing lateral fluctuation of the deflecting angle of the lamp. When the speed is gradually reduced, since the restrains on the maximum deflection angle is alleviated, the area immediately in front of the vehicle in the traveling direction may be illuminated correctly even on the curved road. In addition, since the maximum deflection angle signal is limited in accordance with reduction in vehicle speed when the vehicle is in the transitional traveling state between the halted state and the cruising state, continuity of variations in the maximum deflection angle between the halted state and the cruising state may be maintained, and thus sudden changes of the direction of radiation of the lamp at the time of stop and departure may be prevented so as not to give fear of insecurity to the occupant.

DETAILED DESCRIPTION OF THE PREFERRED EMBODIMENTS

Figure 1:
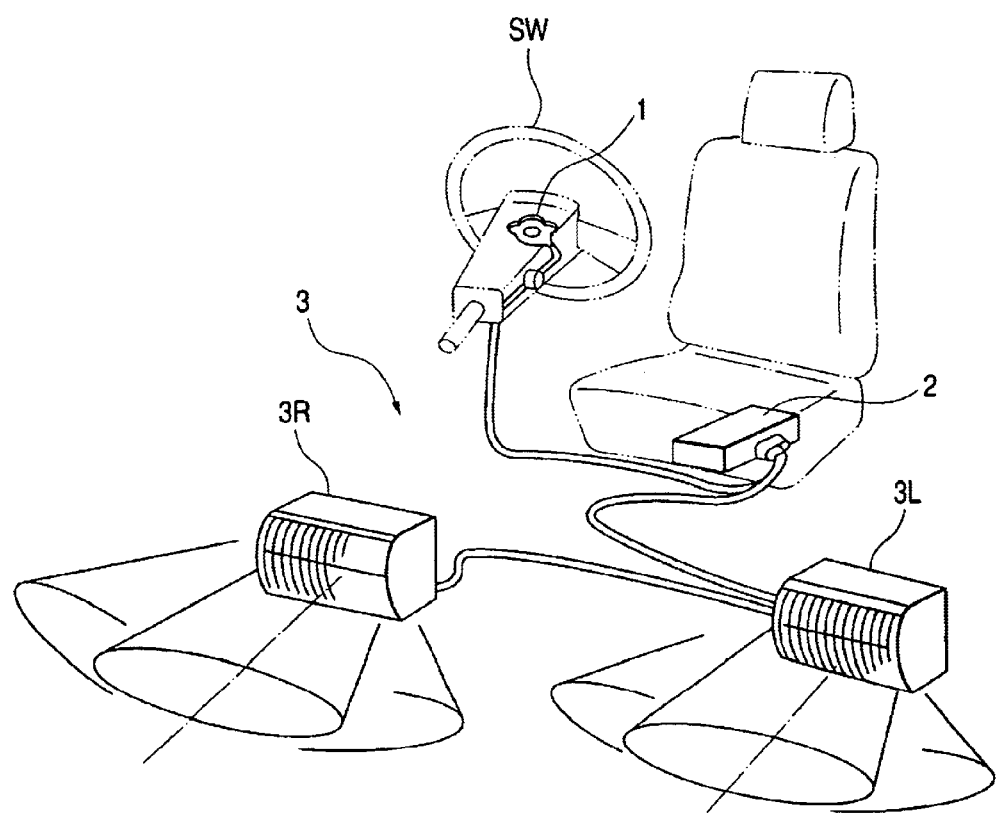
FIG. 1 is a drawing showing the conceptual construction of the AFS.
Figure 2:
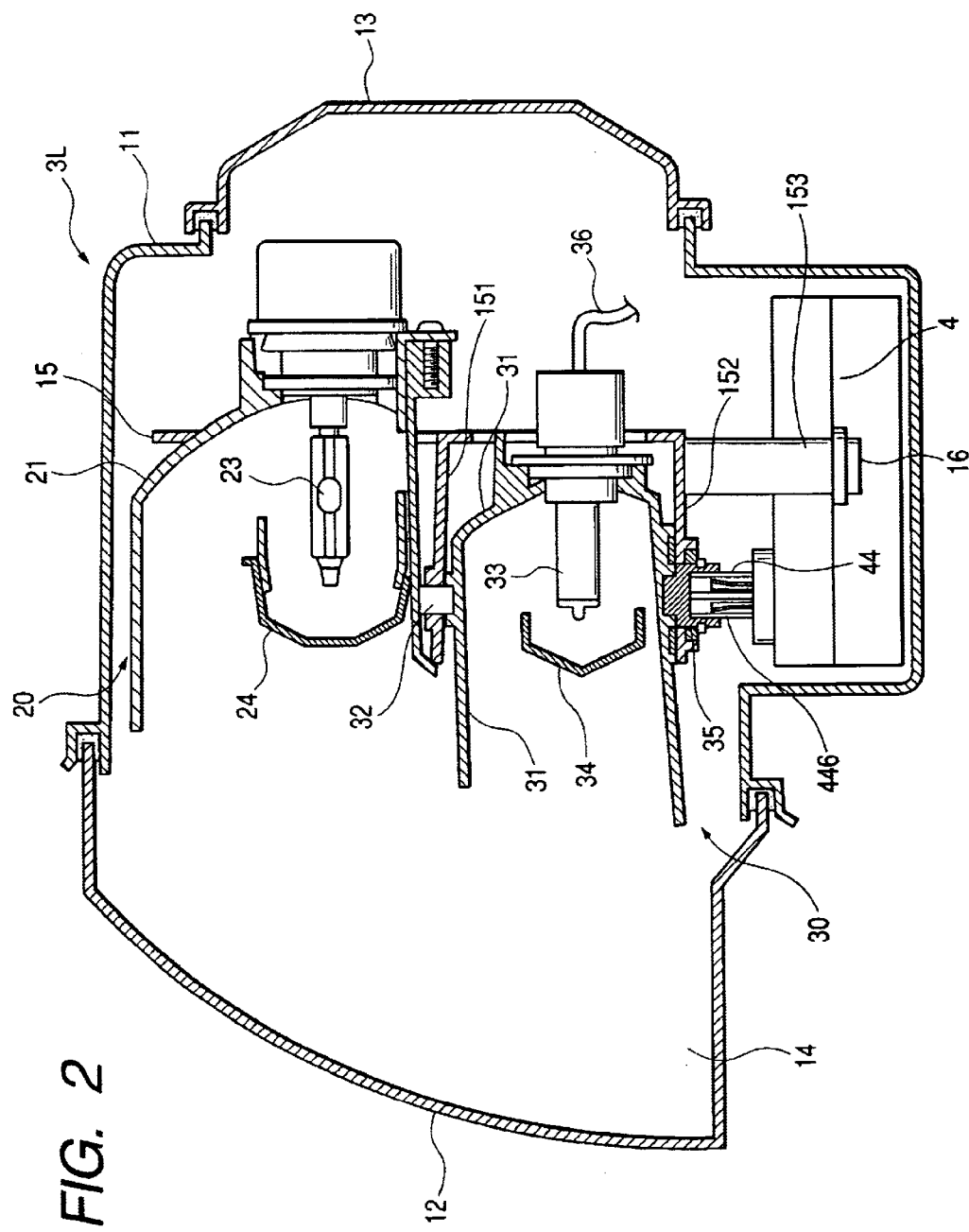
FIG. 2 is a vertical cross section of the swivel lamp.
Figure 3:
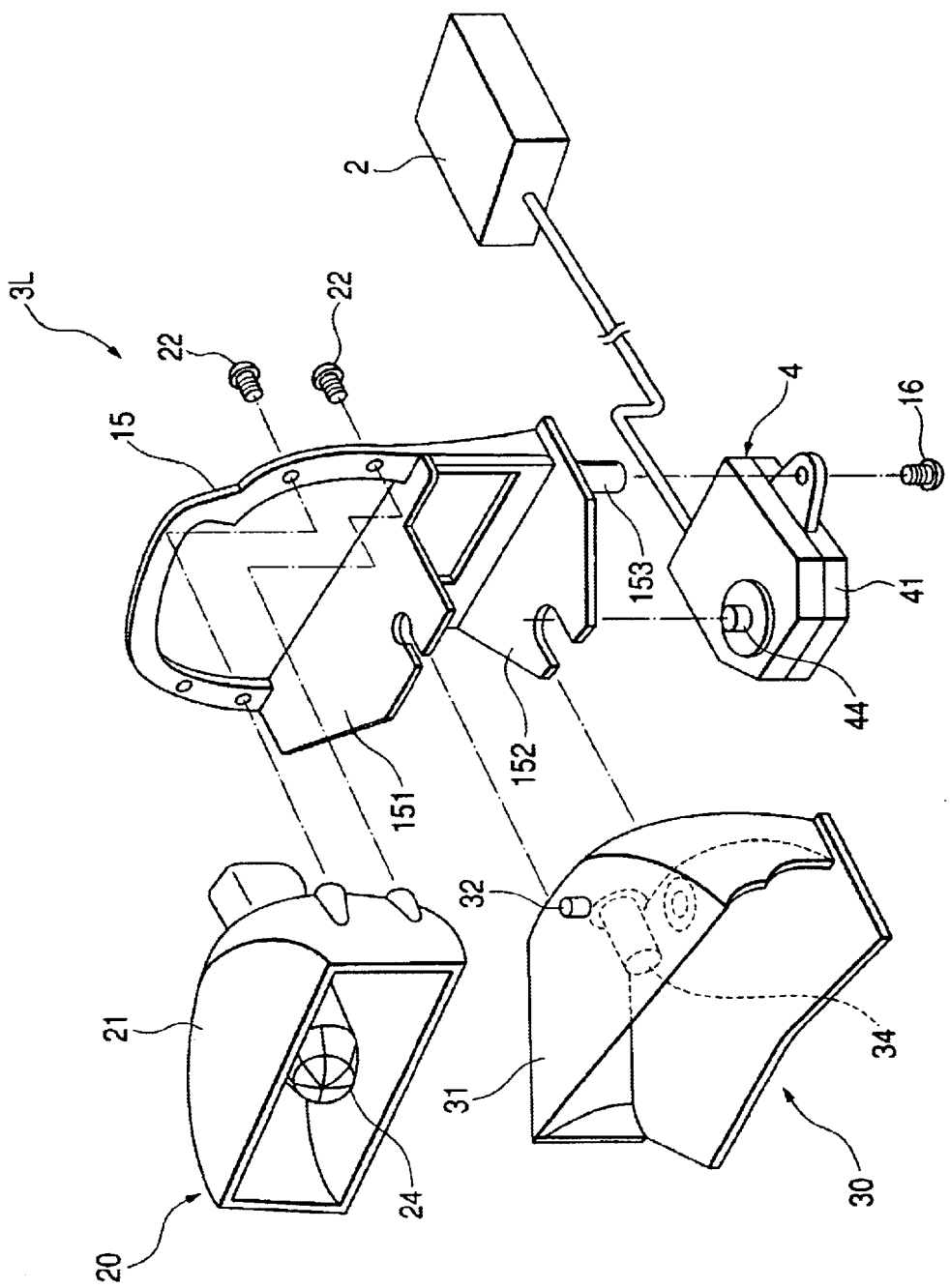
FIG. 3 is an exploded perspective view of the internal construction of the swivel lamp.

Referring now to the drawings, an embodiment of the present invention will be described. FIG. 2 is a vertical cross section of the left lamp 3L of the headlamps constructed of swivel type lights of which the direction of radiation is deflectable toward the left and the right out of the components of the AFS as lamp deflection angle controlling means according to the present invention shown in FIG. 1, FIG. 3 is a partially exploded perspective view of the internal construction thereof. The lamp body 11 is provided with a lens 12 at the front opening thereof and a cover 13 at the rear opening thereof to define a lamp chamber 14, and the lamp chamber 14 is provided with a fixed bracket 15 in the shape of a shelf having an upper plate 151 and the lower plate 152 therein. The fixed bracket 15 is provided with a fixed reflector 21 mounted at the upper portion thereof, and a swivel reflector 31 supported at the lower portion thereof. The fixed reflector 21 is fixed on the upper plate 151 of the fixed bracket 15 by means of a screw 22, and a discharge bulb 23 is mounted in the fixed reflector 21 together with a shade 24, so as to be constructed as a fixed lamp 20 having a prescribed luminous intensity distribution characteristic toward the front of the motor vehicle. The swivel reflector 31 is interposed between the upper plate 151 and the lower plate 152 of the fixed bracket 15, and fitted and supported so as to be capable of rotating in the horizontal direction about a supporting shaft 32 projected from the upper surface of the swivel reflector 31, and is provided therein with a halogen bulb 33 mounted together with a shade 34. An actuator 4 driven by the ECU 2 shown in FIG. 1 is fixed and supported on the lower side of the lower plate 152 of the fixed bracket 15 in the lamp chamber 14, and a stem 153 provided on the fixed bracket 15 is fixed on a part of the actuator 4 by means of a screw 16. The revolving output shaft 44 of the actuator 4 is connected to the bearing portion 35 provided on the lower surface of the swivel reflector 31 at the coaxial position with the supporting shaft 32, so that the swivel reflector 31 is driven and rotated by a rotational driving force of the revolving output shaft 44, and constructs a swivel lamp 30 of which the direction of radiation can be deflected toward the left and the right.

Figure 4:
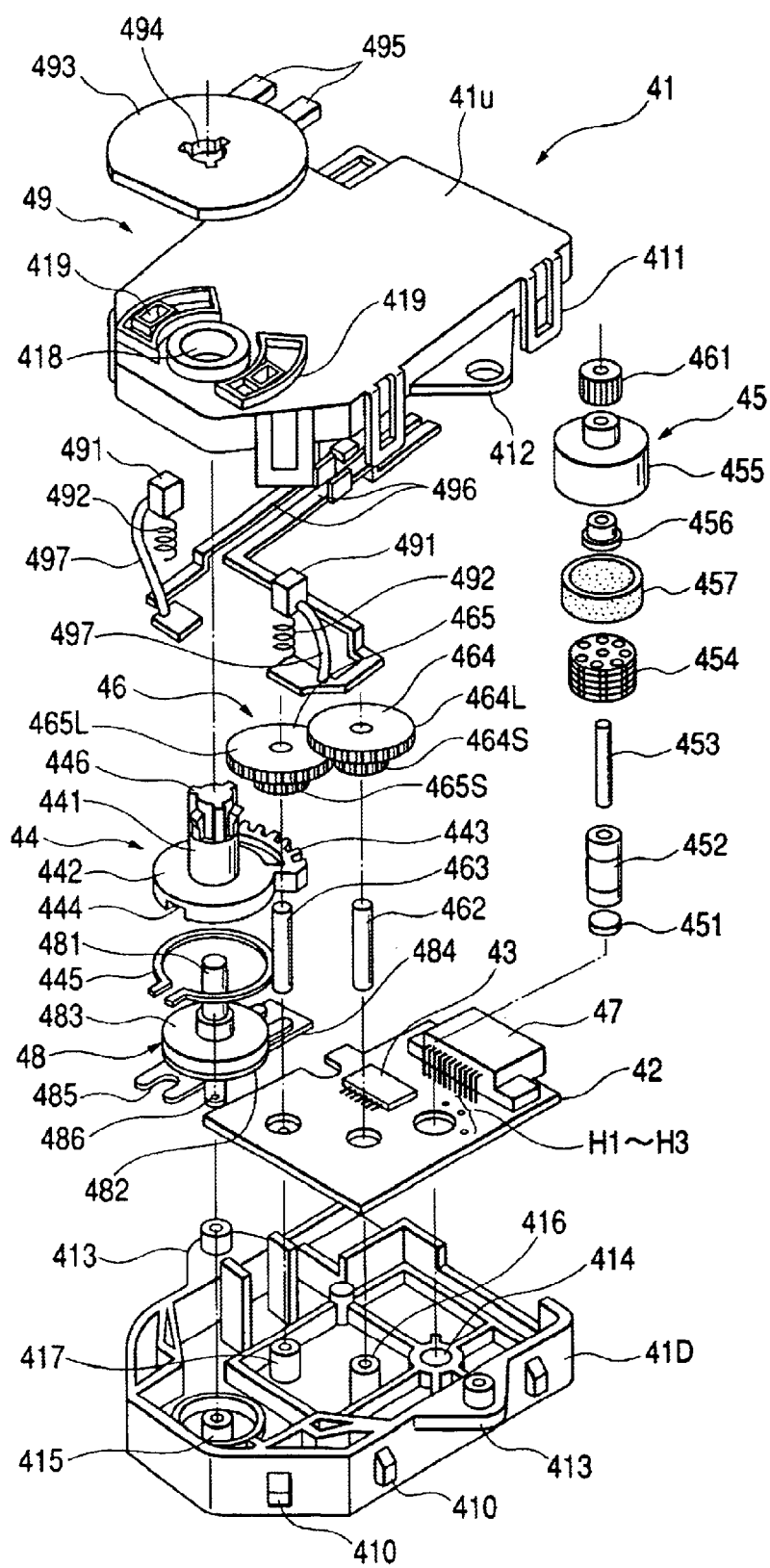
FIG. 4 is a partial exploded perspective view of the actuator.
Figure 5:
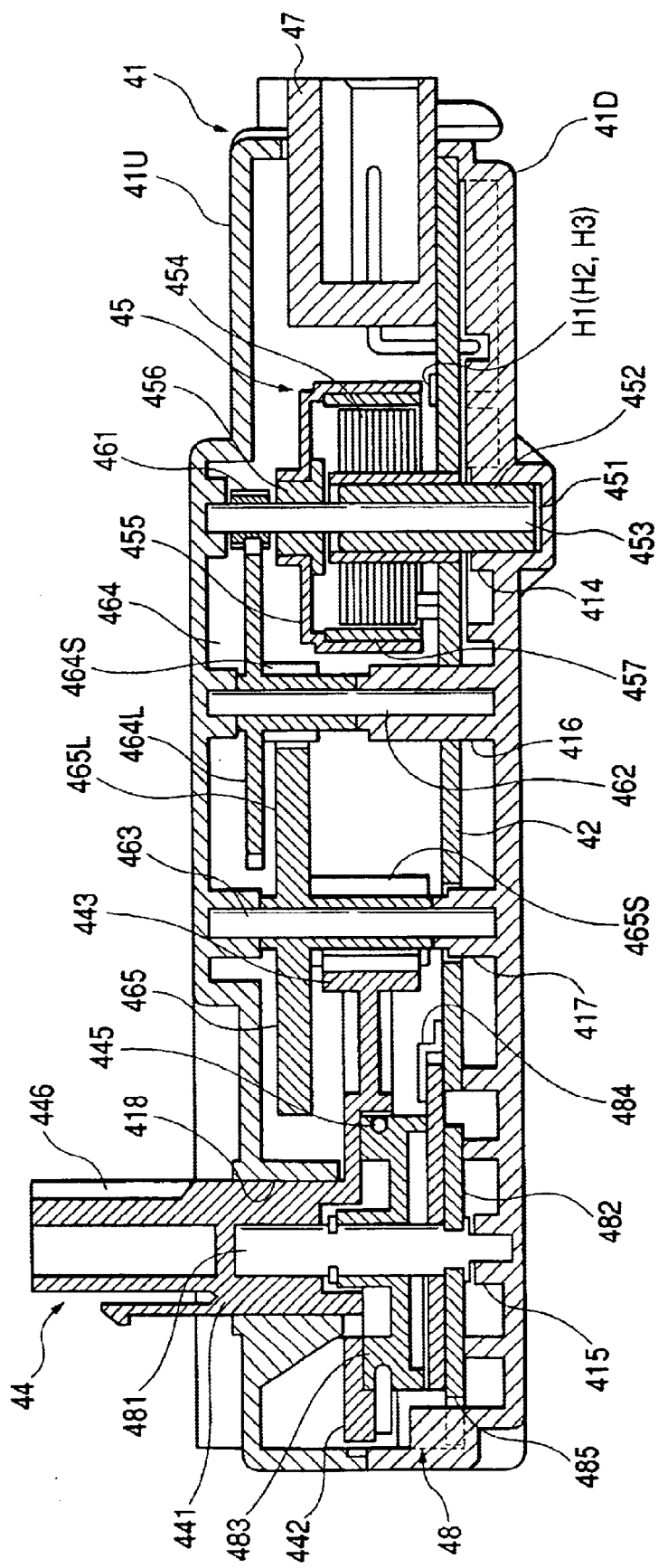
FIG. 5 is a vertical cross section of the actuator.

FIG. 4 is an exploded perspective view of the principal portion of the actuator 4, and FIG. 5 is a vertical cross section in its assembled state. The case 41 comprises a lower half 41D and the upper half 41U, and the projection 410 on the lower half 41D and the fitting strip 411 of the upper half 41U are fitted with respect each other. The upper half 41U and the lower half 41D are formed with the supporting strips 412, 413 projecting therefrom for supporting the fixed bracket 15 toward both sides respectively. The case 41 contains a printed board 42 having an electronic part 43 as a control circuit that will be described later, the revolving output shaft 44 for directly rotating the swivel reflector 31, a brushless motor 45 as a driving source for rotating the revolving output shaft 44, and a speed reducing gear mechanism 46 for transmitting a rotational force of the brushless motor 45 to the revolving output shaft 44 mounted thereon. The revolving output shaft 44 is provided with a potentiometer 48 as lamp deflecting angle detecting means disposed coaxially therewith. The printed board 42 is provided with a connector 47 to which the vehicle-mounted power cable, not shown, is connected for supplying electric power to the brushless motor 45 and the halogen lamp 33 of the swivel lamp 30 respectively. The upper half 41U is provided with a movable contact mechanism 49 for electrically connecting the actuator 4 and the cable 36 of the halogen lamp 33 on the upper surface thereof.

Figure 6:
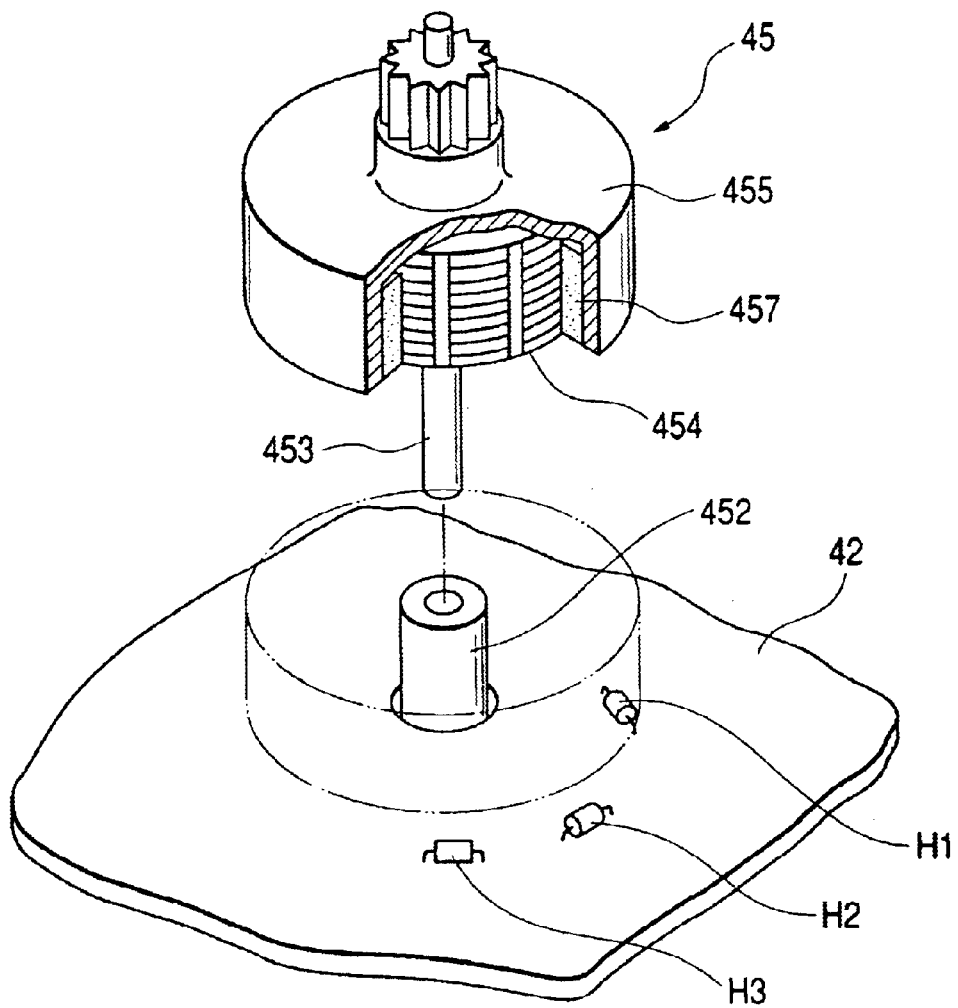
FIG. 6 is a partially enlarged perspective view of a brushless motor.

The brushless motor 45 comprises, as shown in FIG. 6 as a partially broken perspective view, a revolving shaft 453 supported in the boss hole 414 of the lower half 41D by means of a thrust bearing 451 and the bearing sleeve 452 so as to be capable of torsional rotation, a stator coil 454 fixed and supported on the printed board 42 around the revolving shaft 453, and a rotor 455 formed in the shape of a cylindrical container fixed to the revolving shaft 453 and mounted so as to cover the stator coil 454. The rotor 455 is fixed to the revolving shaft 453 by the rotor boss 456, and provided with a cylindrical rotor magnet 457 integrally on the inner surface thereof. The stator coil 454 comprises three pairs of coils equally distributed in the circumferential direction, and each pair of coils is fed with power via the printed wiring of the printed board 42, not shown, and magnetized into S-pole and N-pole alternately in the circumferential direction by such power feeding. The rotor magnet 457 is magnetized into S-pole and N-pole alternately in the circumferential direction corresponding to the stator coil 454. In the brushless motor 45, by supplying alternate current having different phases, that is, three phase current with respect to three coils of the stator coil 454, the rotor magnet 457, that is, the rotor 455 and the revolving shaft 453 are driven to rotate. In addition, as shown in FIG. 6, a plurality of, in this case, three hall elements H1, H2, H3 are disposed and supported on the printed board 42 at required intervals along the circumferential direction of the rotor 455, so that the magnetic field in each hall element H1, H2, H3 is changed when the rotor magnet 457 is rotated along with the rotor 455, and the state of each hall elements H1, H2, H3 is changed between ON and OFF to supply pulse signal corresponding to the cycle of rotation of the rotor 455.

The potentiometer 48 is provided with a fixed substrate 482 fixed on the fixed shaft 481 passing through the printed board 42 and standing upright in the boss hole 415 of the lower half 41D, and having a resistance pattern, not shown, formed on the surface thereof, and a rotary disc 483 rotatably supported on the fixed shaft 481 so as to face toward the fixed substrate 482 in the axial direction, and having a sliding contact point, not shown, for sliding on the surface of the resistance pattern. The fixed substrate 482 is prevented from rotating with respect to the lower half 41D by engaging the engaging projection 485 provided on a part of the circumference with a part of the inner wall of the lower half 41D. The rotary disc 483 is formed with an adjusting strip 486 projected from a part of the circumference thereof. This potentiometer 48 is constructed in such a manner that a rotary motion of the rotary disc 483 varies the sliding position of the sliding contact point on the surface of the resistance pattern, which in turn varies the resistance value of the resistance pattern provided on the fixed substrate 482, and the resistance value is supplied from the electrode terminal 484 on the fixed substrate 482 as the rotational position of the revolving output shaft, or as the deflection angle detected signal of the swivel reflector 31.

The revolving output shaft 44 is adapted to be connected with the rotary disc 483 of the potentiometer 48 via a clutch, and comprises a hollow shaft 441 covered on the fixed shaft 481 of the potentiometer 48 so as to be capable of torsional rotation, a clutch cylinder 442 in the shape of a short cylinder integrally provided at the lower end portion of the hollow shaft 441, and a sector gear 443 formed integrally along a part of the outer periphery of the clutch cylinder 442. The clutch cylinder 442 is disposed so as to cover the rotary disc 483 and provided at a part of the circumference thereof with a notch 444. A clutch spring 445 formed by bending the spring wire material into a substantially circular shape and being resiliently attached on the peripheral surface of the rotary disc is engaged with the notch 444 at both ends, whereby the clutch cylinder 442 is connected to the rotary disc 483 via the clutch spring 445 so as to be frictional in the direction of rotation. Therefore, by rotating the revolving output shaft 44, or the clutch cylinder 442, by manual operation in a state in which rotation of the rotary disc 483 is locked by holding the adjusting strip 486 projected from a part of the circumference of the rotary disc 483 with a jig or the like, relative position between the potentiometer 48 and the revolving output shaft 44 in the direction of rotation can be adjusted by rotating the revolving output shaft 44 in a sliding motion with respect to the rotary disc 483 by the frictional connection of the clutch spring 445. The relative position adjustment is utilized for zero adjustment of the output from the potentiometer 48.

The speed reducing gear mechanism 46 is provide in the region between the brushless motor 45 and the sector gear 443 of the potentiometer 48. The speed reducing gear mechanism 46 comprises a drive gear 461 mounted on the revolving shaft 453 of the brushless motor 45 and a first gear 464 and a second gear 465 rotatably supported respectively on two fixed shafts 462, 463 passing through the printed board 42 and standing upright at a required interval in the boss holes 416, 417 of the lower half 41D. The first gear 464 and the second gear 465 comprises integrally formed larger gears 464L, 465L and smaller gears 464S, 465S respectively. The drive gear 461 engages the larger gear 464L of the first gear 464, and the smaller gear 464S of the first gear 464 engages the larger gear 465L of the second gear 465, and then the smaller gear 465S of the second gear 465 engages the sector gear 443. Accordingly, a rotational force of the brushless motor 45 is reduced by the speed reducing gear mechanism 46 and transmitted to the sector gear 443, so that the revolving output shaft 44 is rotated at a reduced speed. The upper end portion of the revolving output shaft 44 is formed as a spline shaft 446 and passed through the output shaft hole 418 formed on the upper half 41U and projected from the upper surface of the case 41, so as to be fitted in the spline groove on the bearing portion 35 provided on the lower surface of the swivel reflector 31 to allow the swivel reflector 31 to rotate integrally by a rotational force of the revolving output shaft 44.

The movable contact point mechanism 49 disposed on the upper surface of the upper half 41U comprises a pair of contact point brushes 491 contained in the case 41, partially exposed part of them through a pair of rectangular holes 419 formed on the upper surface on a circumference and urged into the projecting direction by the springs 492, and a contact plate 493 having a spline shaft hole 494 for fitting the spline shaft 446 of the revolving output shaft 44 therein so as to be rotated integrally with the revolving output shaft 44 in the direction of rotation in the region above the contact point brushes 491. The contact point plate 493 is provided on the lower surface thereof with a pair of contact point strips (not shown) extending therefrom for sliding contact with the contact point brushes 491, so as to be capable of rotating together with the revolving output shaft 44 in a state in which the electrical contact with the contact point brushes 491 is maintained. The contact point plate 493 is provided with an electrode terminal 495 continuing to the contact point strip, and the electrode terminal 495 may be attached and detached with a connector, not shown, of the cable 36 connected to the halogen lamp 33 of the swivel lamp 30 shown in FIG. 2. The pair of contact point brushes 491 are connected to the ends of a pair of narrow conductive plates 496 extending respectively in the case 41 via the conductive wires 497, which in turn is electrically connected to the vehicle mounted power source, not shown, by a connector, not shown, to be connected to the other ends of the conductive plates 495. Accordingly, the movable contact point mechanism 49 electrically connects the halogen lamp 33 with the vehicle-mounted power source, and prevents the cable 36 for connecting the swivel lamp 30 and the actuator 4 from becoming kinked when the swivel reflector 31 of the swivel lamp 30 is moved, thereby ensuring smooth rotational movement of the swivel reflector 31.

Figure 7:
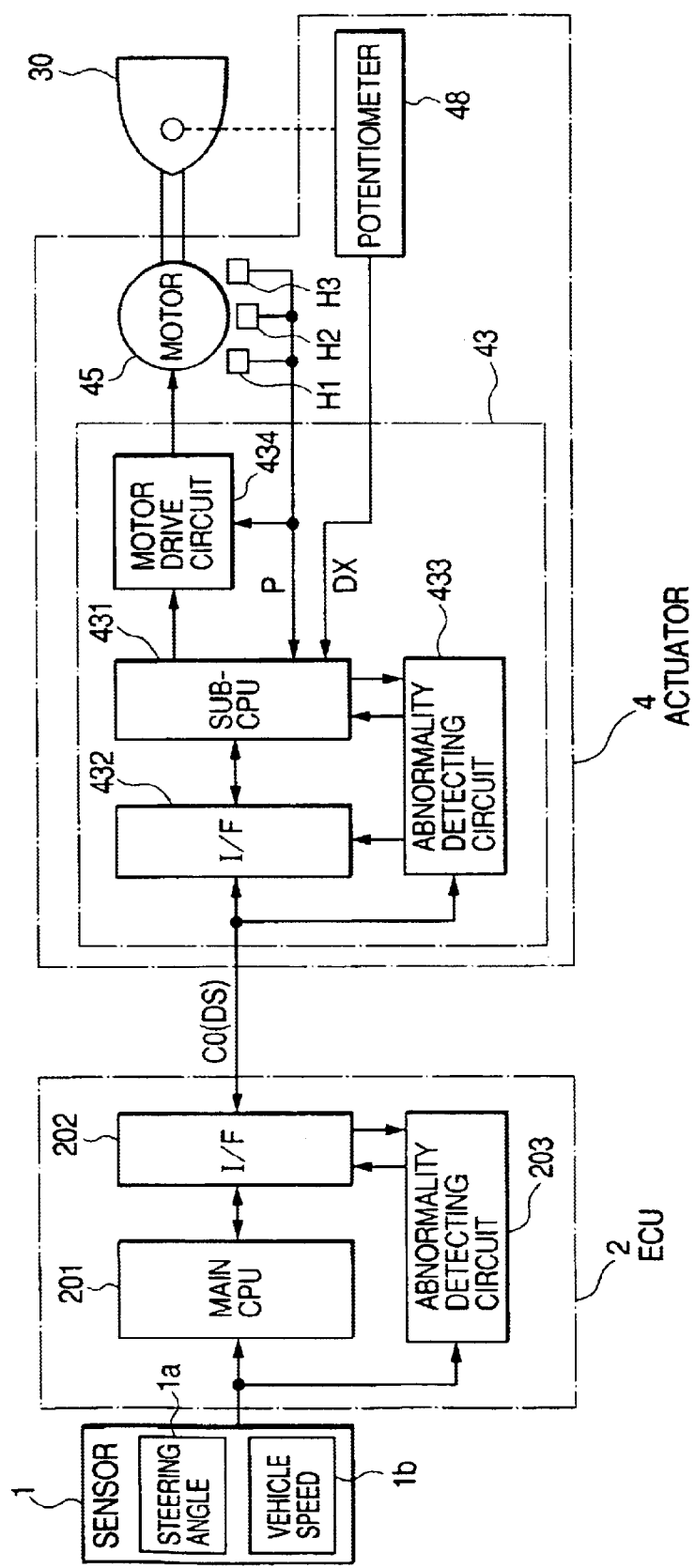
FIG. 7 is a block circuit diagram showing a circuit construction of the AFS.

FIG. 7 is a block circuit diagram showing the construction of the electric circuit of the ECU 2 and the actuator 4. The actuator 4 is mounted on the left and right swivel lamps 3L, 3R of the motor vehicle respectively, and being able to intercommunicate with the EUC 2. The aforementioned ECU 2 comprises a main CPU 201 which receives the output from each of a steering angle sensor 11 for detecting the steering angle of the steering wheel SW and a vehicle speed sensor 12 for detecting the speed of the vehicle as the sensor 1 described above, for processing by a prescribed algorithm based on information from the information of these sensor outputs, an interface circuit 202 for feeding and receiving the control signal CO between the main CPU 201 and the actuator 4 (hereinafter referred to as I/F), and an abnormality detecting circuit 203 for observing the various signals in the ECU 2 including the main CPU 201 and supplying the abnormality-detected signal when abnormality is detected. The function of the abnormality detecting circuit 203 may be performed by the main CPU 201.

The controlling circuit 43 comprising electronic components contained in the actuators 4 provided respectively in the swivel lamps 30 provided in the left and right swivel type lights 3L, 3R of the motor vehicle comprises an I/F circuit 432 for feeding and receiving the signal to and from the ECU 2, a sub-CPU 431 for processing by a prescribed algorithm based on the signal entered form the I/F circuit 432, pulse signal P fed from the hall elements H1, H2, H3, and the deflection angle detected signal DX entered from the potentiometer 48, an abnormality detecting circuit 433 for observing signals supplied through the I/F circuit 432 and supplying an abnormality-detected signal to the sub-CPU 431 when such signals are determined to be abnormal, and a motor drive circuit 434 for driving and rotating the brushless motor 45. The deflection angle signal DS of the swivel lamp 30 is supplied from the ECU 2 as a part of the aforementioned control signal, and entered into the actuator 4.

Figure 8:
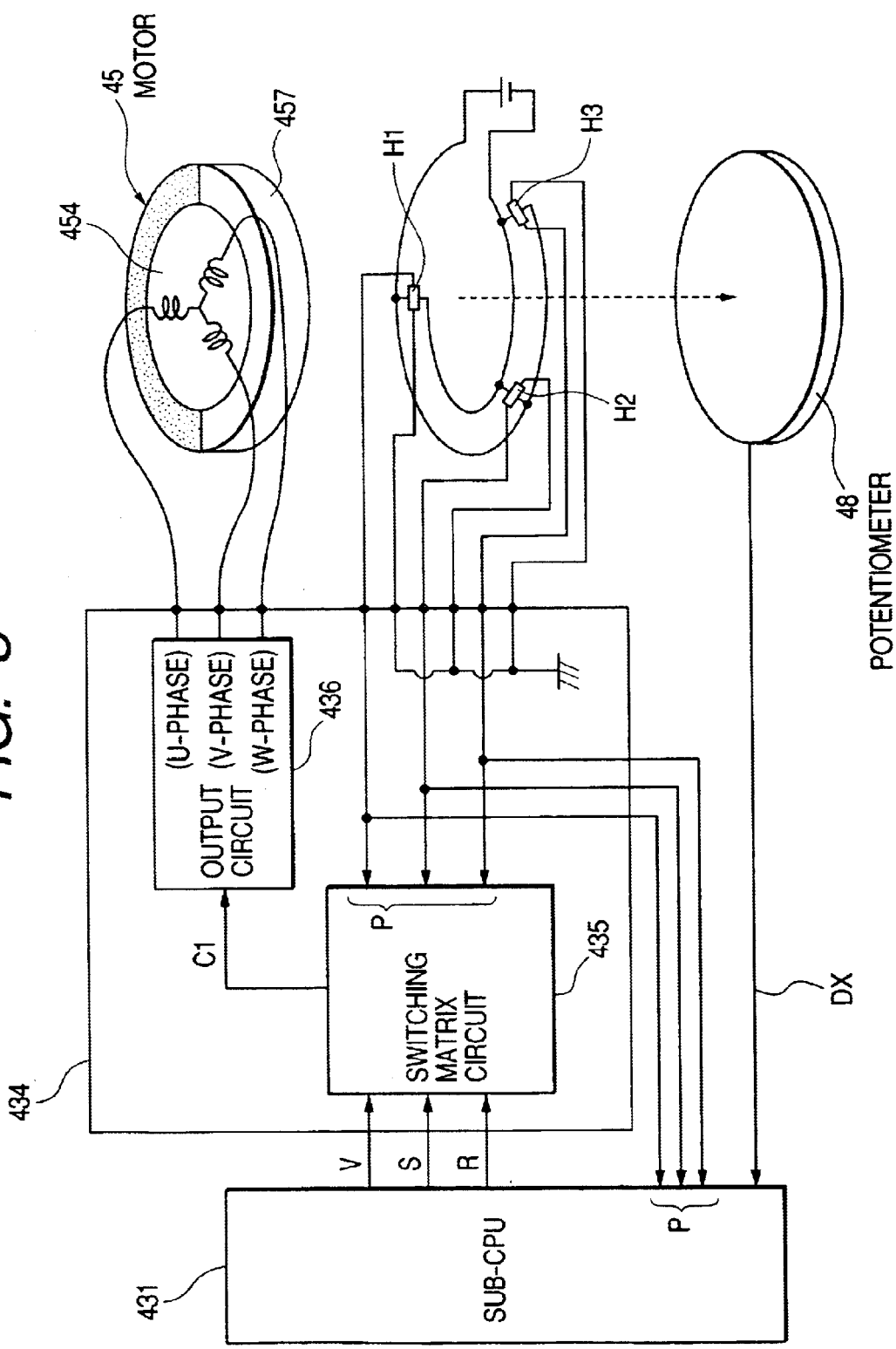
FIG. 8 is a circuit diagram showing a circuit construction of the actuator.

FIG. 8 is a circuit diagram showing a frame format of the motor drive circuit 434 and the brushless motor of the actuator 4. A switching matrix circuit 435 for receiving speed control signal V, start/stop signal S, normal/reverse rotation signal R respectively from the sub-CPU of the actuator 4 as control signal, and pulse signal from the three hall elements H1, H2, H3, and an output circuit 436 for adjusting the phase of electric power in three phases (U phase, V phase, and W phase) to be supplied to three pairs of coils in the stator coil 454 of the brushless motor 45 upon receipt of the output from the switching matrix circuit 435. In this motor drive circuit 434, supplying each electric power of U phase, V phase, and W phase to the stator coil 454 rotates the magnet rotor 457, and thus the rotor 455 and the revolving shaft 453 integrated therewith rotate. When the magnet rotor 457 rotates, each hall element H1, H2, H3 detects variations in magnetic field, and then supplies pulse signal P. The pulse signal P is entered into the switching matrix circuit 435, and the switching operation in the output circuit 436 is performed in exact timing with the pulse signal supplied into the switching matrix circuit 435, so that the rotation of the magnet rotor 457 continues. The switching matrix circuit 435 supplies a required control signal C1 to the output circuit 436 base on speed control signal V, start/stop signal S, and normal/reverse rotation signal R from the sub-CPU 431. The output circuit 436, upon receipt of the control signal C1, adjusts the phase of electric power in three phases to be supplied to the stator coil 454 to control the start and stop of the rotational motion, the direction of rotation, and speed of rotation of the brushless motor 45. The output from the potentiometer 48 provided in the actuator 4 is entered into the sub-CPU 431. The sub-CPU 431 receives a part of the pulse signal P supplied from each hall element H1, H2, H3, and recognizes the rotating state of the brushless motor 45.

According to the construction described above, when detected information on the steering angle of the steering wheel SW of the motor vehicle output from the steering angle sensor 11 provided in the vehicle as shown in FIG. 1, and information on the speed of the motor vehicle output from the vehicle speed sensor 12 are input to ECU2, the ECU 2 performs calculation based on a predetermined algorithm in the main CPU 201 based on the supplied information, calculates the deflection angle signal DS of the swivel lamp 30 of the swivel type lights 3L, 3R in the motor vehicle, and enters it into the respective actuators 4 of the swivel type lights 3L, 3R. Then, in the actuator 4, the sub-CPU 431 performs calculation based on the supplied deflection angle signal DS, calculates the signal corresponding to the deflection angle signal and supplies to the motor drive circuit 434, and drives and rotates the brushless motor 45. Since the rotational drive force of the brushless motor 45 is decelerated in the speed reducing gear mechanism 46 and transmitted to the revolving output shaft 44, the swivel reflector 31 connected to the revolving output shaft 44 rotates in the horizontal direction, and the direction of the optical axis of the swivel lamp 30 is varied. When the swivel reflector 31 makes a rotary motion, the rotary disc 483 of the potentiometer 48 is rotated with the rotation of the revolving output shaft 44, and thus the rotating angle of the revolving output shaft 44, or the deflecting angle of the swivel reflector 31 is detected based on variations in resistance value when the sliding contact point is slid on the surface of the resistance pattern on the fixed substrate 482 by a rotary motion of the rotary disc 483, and the deflection angle detected signal DX is entered into the sub-CPU 431. The sub-CPU 431 then compares the deflection angle detected signal DX with the deflection angle signal DS supplied form the ECU 2, and performs feedback control on the rotating angle of the brushless motor 45 to make them coincide with each other, so that the direction of the optical axis of the swivel reflector 31, or the direction of the optical axis of the swivel lamp 30 can be controlled to the angular position set by the deflection angle signal DS with high degree of accuracy.

With such deflecting motion of the swivel reflector 31, in both of the swivel type lights 3L, 3R, light directed in the straight ahead direction of the motor vehicle emitted from the fixed lamp 20 and deflected light emitted from the swivel lamp 30 are joined to illuminate the area including the left and right areas deflected from the straight ahead direction of the motor vehicle, so that not only the straight ahead direction of the motor vehicle, but also the front area in the steered directions can be illuminated during travel of the motor vehicle, thereby enabling enhancement of driving safety.

The abnormality detecting circuits 203, 433 detect the abnormality in AFS respectively and supply the abnormality-detected signal. The main CPU 201 and the sub CPU 431, upon receipt of the abnormality-detected signal, release the swivel lamp 30 from the aforementioned deflected state and force the optical axis of the swivel lamp 30 to be set to a prescribed reference position of deflection so that the traffic safety problem in that the optical axis of the swivel lamp 30 stays in the deflected state and cannot be adjusted due to abnormality of the AFS can be solved, which will not be described here.

Figure 9:
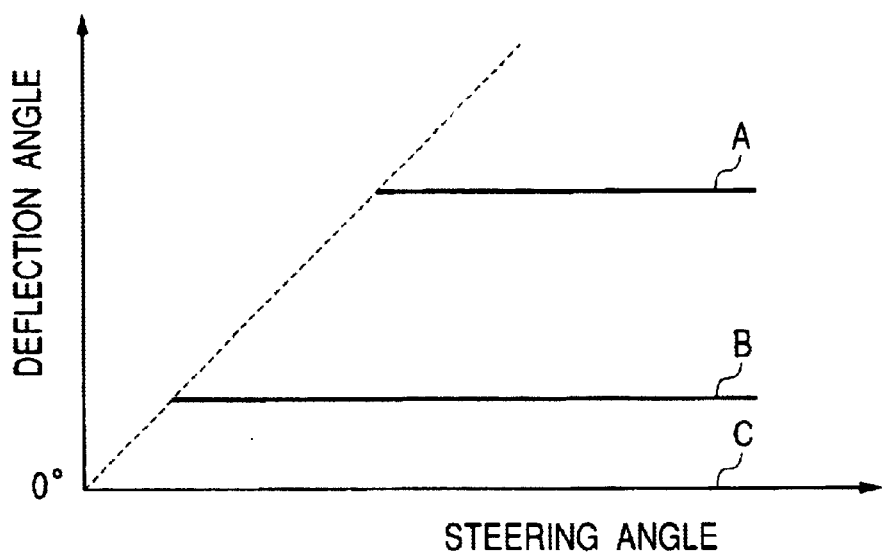
FIG. 9 is a characteristic plot illustrating the relative relationship between the steering angle and the deflection angle and the maximum deflection angle.

In the main CPU 201 of the aforementioned ECU 2, the maximum deflection angle DM included in the aforementioned deflection angle signal DS is controlled based on information on the vehicle speed from the vehicle speed sensor 12. FIG. 9 is a characteristic plot for relative relationship between the output from the steering angle sensor 11 represented by the abscissa axis and the deflection angle of the swivel lamp 30 represented by the vertical axis, in which the deflection angle varies in prescribed linear characteristics with respect to the steering angle as shown in the broken line shown in the same figure for the sake of convenience. Then the maximum deflection angle DM is controlled as shown in the solid lines A, B, C respectively in the same figure according to the vehicle speed output from the vehicle speed sensor 12.

Figure 10:
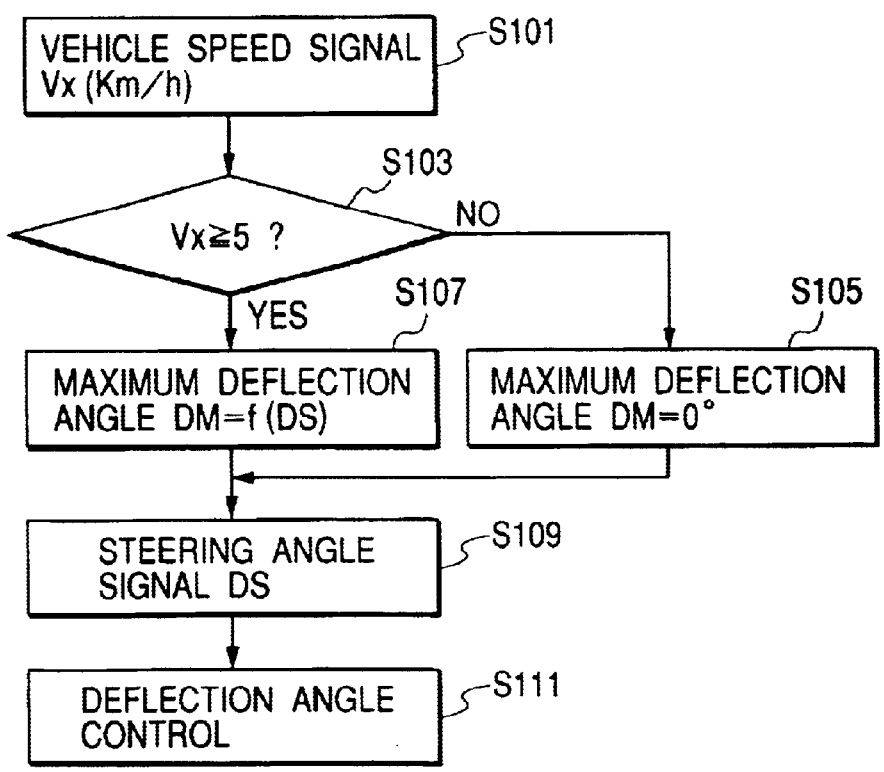
FIG. 10 is a flow chart of the operation of a first embodiment.
Figure 11:
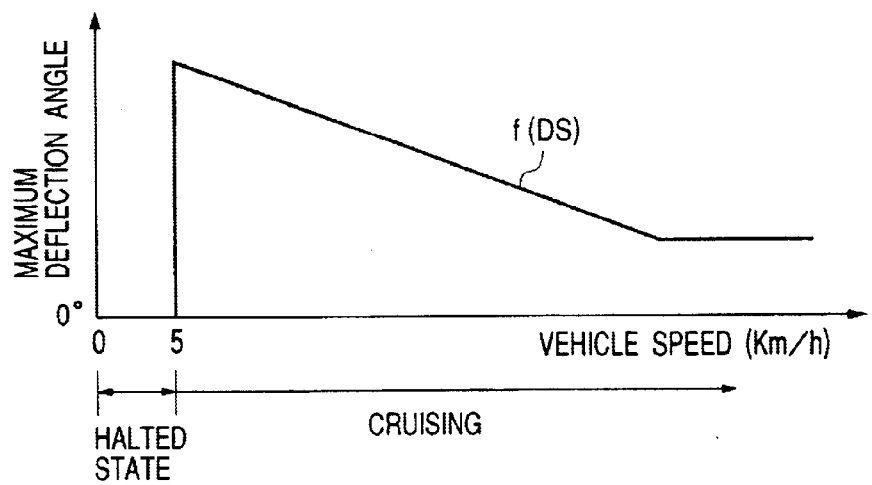
FIG. 11 is a characteristic plot illustrating the relative relationship between the vehicle speed and the maximum deflection angle according to a second embodiment.

FIG. 10 is a flow chart for illustrating the setting of such maximum deflection angle DM in the main CPU 201 in a first embodiment and an algorithm for controlling deflection angle in the sub-CPU in the actuator 4. FIG. 11 is a characteristic drawing showing the relative relationship between the vehicle speed represented by the abscissa axis and the maximum deflection angle represented by the vertical axis. In this embodiment, the vehicle speeds of the motor vehicle lower than 5 km/h are defined as the halted state, and the vehicle speeds of 5 km/h or higher are defined as the cruising state. Then, the vehicle speed Vx obtained from the vehicle speed sensor 12 is input into the main CPU 201 (S101), and the main CPU determines whether the motor vehicle is in the halted state or in the cruising state based on the vehicle speed Vx (S103). When the vehicle speed Vx is lower than 5 km/h and thus it is determined to be the halted state, 0° is output as the maximum deflection angle DM (S105).

In contrast to it, when the motor vehicle is traveling at 5 km/h or higher and thus is determined to be in the cruising state in the step S103, the maximum deflection angle DM which is inversely proportional to the vehicle speed and thus reduces linearly or as a quadratic function is output, which is a function f (DS) with the angle of the steering angle signal DS as a variable (S107). The function f (DS) in this embodiment outputs a signal of the maximum deflection angle DM having such characteristic that the maximum deflection angle reduces like a linear function within the range from the characteristic represented by A to the characteristic represented by B in FIG. 9 with increase in vehicle speed, and fixes the maximum deflection angle to the characteristic represented by B at a certain level of high speed.

When the maximum deflection angle DM is set based on the vehicle speed as described above, and the deflection angle signal DS including the maximum deflection angle DM as information is output to the actuator 4 from the ECU 2 (S109), the sub-CPU 431 of the actuator 4 controls the deflection angle of the swivel lamp 30 according to the steering angle within the range of the maximum deflection angle DM based on the steering angle signal DS (S111). Practically, it is adapted to control the maximum absolute value of the signal level of the deflection angle signal DS according to the maximum deflection angle DM, and the actuator is adapted to control the maximum value of the deflection angle of the swivel lamp by controlling the maximum amount of revolution of the brushless motor based on the maximum absolute value of the signal level of the deflection angle signal DS.

In this construction, when the motor vehicle is in the halted state (vehicle speed: 0–5 km/h), the maximum deflection angle is 0°, and thus the deflection angle of the swivel lamp 30 is 0°. Therefore, when the motor vehicle is in the states of crawling, or being halted or parked, or putting into a garage, the direction of radiation of the swivel lamp is fixed to the straight ahead direction of the motor vehicle, whereby the area in the vicinity of the motor vehicle is illuminated in the stable state without dazzling the motor vehicles or the pedestrians passing nearby, and unpleasant feeling due to a large deflection of the direction of radiation of the headlamp may be prevented.

On the other hand, when the motor vehicle is in the cruising state (5 km/h or higher), the value of the maximum deflection angle DM decreases gradually with increase in vehicle speed. Therefore, when the steering wheel SW is turned by a prescribed angle, the more the speed increases, the more the maximum deflection angle of the swivel lamp 30 is suppressed, and thus the deflection angle of the swivel lamp 30 based on the deflection angle signal DS from the ECU 2 is controlled within the range around the straight ahead direction of the vehicle. Therefore, in the cruising state, the area around the straight ahead direction at a corresponding distance in the traveling direction of the vehicle can be illuminated irrespective of the steering state of the steering wheel SW, and especially when the steering wheel SW is turned little by little, large lateral fluctuation of the direction of radiation of the swivel lamp 30 may be prevented, thereby ensuring a correct illumination by the AFS. In the cruising state as well, when the speed decreases gradually, the restraints on the maximum deflection angle DM is alleviated and thus the area immediately in front of the vehicle in the traveling direction may be illuminated correctly even on the curved road, thereby ensuring the traffic safety in this aspect.

Figure 12:
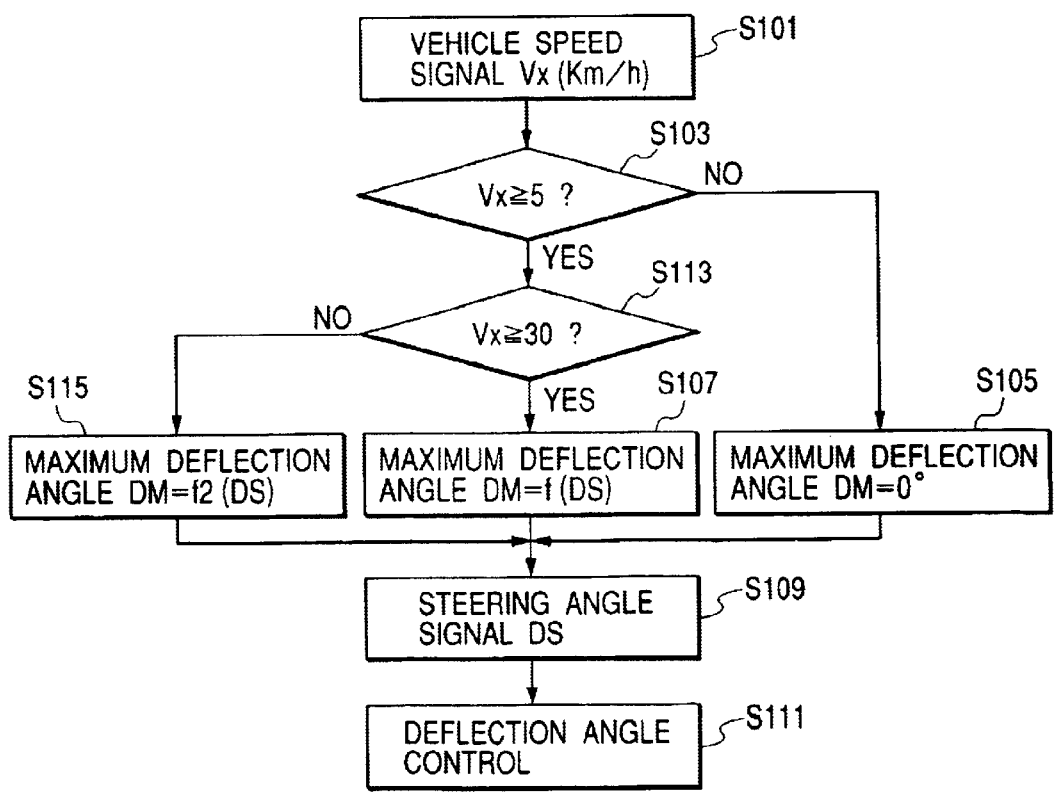
FIG. 12 is a flow chart of the operation of the second embodiment.
Figure 13:
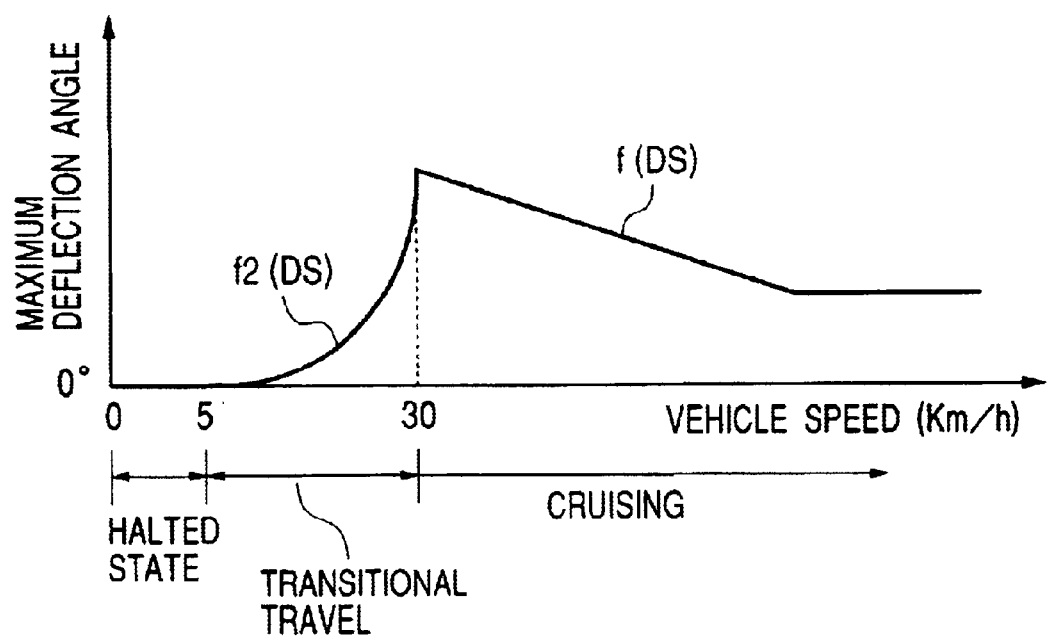
FIG. 13 is a characteristic plot showing the relative relationship between the vehicle speed and the maximum deflection angle according to the second embodiment.

FIG. 12 is a flow chart illustrating the algorithm for controlling such maximum deflection angle DM in the main CPU 201 and the deflection angle in the sub-CPU 431 of the actuator 4 according to a second embodiment, and FIG. 13 is a characteristic plot for relative relationship between the vehicle speed and the maximum deflection angle. According to the first embodiment, since the maximum deflection angle varies significantly on reaching the vehicle speed of 5 km/h, the deflection angle may be unstable around this vehicle speed. Accordingly, in the second embodiment, the vehicle speeds of the motor vehicle lower than 5 km/h are defined as the halted state, the vehicle speeds of the range from the 5 km/h inclusive to 30 km/h exclusive as the transitional traveling state, and the vehicle speed of 30 km/h or higher as the cruising state.

In the second embodiment, controls of the maximum deflection angle DM in the halted state and in the cruising state are the same as those in the first embodiment as shown in the steps S101–S107. In other words, in the halted state (vehicle speed: 0–5 km/h), the maximum deflection angle is 0°, and thus the deflection angle of the swivel lamp 30 is 0°. Therefore, when the motor vehicle is in the state of crawling, or being halted or parked, or putting into a garage, the direction of radiation of the swivel lamp 30 is fixed to the straight ahead direction of the motor vehicle, whereby the area in the vicinity of the motor vehicle is illuminated in the stable state without dazzling the motor vehicles or the pedestrians passing nearby, and unpleasant feeling due to a large deflection of the direction of radiation of the headlamp may be prevented. On the other hand, when the motor vehicle is in the cruising state (30 km/h or higher), the value of the maximum deflection angle DM decreases gradually with increase in vehicle speed. Therefore, the more the speed increases, the more the maximum deflection angle of the swivel lamp 30 is suppressed, and thus the deflection angle of the swivel lamp 30 based on the deflection angle signal DS from the ECU 2 is controlled within the range around the straight ahead direction of the vehicle. Therefore, in the cruising state, the area around the straight ahead direction at the corresponding distance in the traveling direction of the vehicle can be illuminated irrespective of the steering state of the steering wheel SW, and when the steering wheel SW is turned little by little, large lateral fluctuation of the direction of radiation of the swivel lamp may be prevented, thereby ensuring a correct illumination by the AFS. In the cruising state as well, when the speed decreases gradually, the restraints on the maximum deflection angle DM is alleviated and thus the area immediately in front of the vehicle in the traveling direction may be illuminated correctly even on the curved road, thereby ensuring the traffic safety in this aspect.

Further, in the second embodiment, in the transitional traveling state (5–30 km/h) based on the vehicle speed Vx in the step S113, the maximum deflection angle DM is set by the second function f2 (DS) based on the deflection angle signal DS (S115). In this case, in contrast to the case of the cruising state, the value of the maximum deflection angle DM decreases gradually with decrease in vehicle speed. It is for maintaining the continuity of the maximum deflection angle DM between the aforementioned halted state and the cruising state, and for preventing sudden change of the maximum deflection angle of the swivel lamp 30 on reaching the vehicle speed of 5 km/h between the maximum value and the minimum value as in the case of the first embodiment. Therefore, the maximum deflection angle of the swivel lamp 30 is gradually restricted with decrease in the vehicle speed from 30 km/h even when the steering wheel SW is turned, and thus the vehicle speed is decreased to 5 km/h and the restriction is varied smoothly continuously until the maximum deflection angle reaches 0°. Therefore, at the time of stop in which the speed changes from the cruising state to the halted state in a short time, or of departure in which the speed changes on the contrary from the halted state to the cruising state in a short time, sudden changes of the direction of radiation of the swivel lamp 30 in the lateral direction or in the straight ahead direction in accordance with a turning operation of the steering wheel SW may be prevented so as not to give fear of insecurity to the occupant.

Though the maximum deflection angle varies as a quadratic function in the transitional traveling state according to the second embodiment, it is also possible to make it vary linearly. Though the maximum deflection angle varies linearly in the cruising state in each embodiment described above, it is also possible to make it vary as a quadratic function. Alternatively, in both cases, it may be varied step by step by a minute width.

Though an example of the AFS using the headlamp comprising the fixed lamp and the swivel lamp integrated with each other is shown as a swivel type light in the aforementioned embodiment, such construction that the swivel lamp, being formed as a single independent light, is used as an auxiliary lamp and combined with the headlamp comprising a fixed lamp to construct a swivel type light is also employed.

As is described above, according to the present invention, when the vehicle is almost in the state of coming to stop, by setting the maximum deflection angle of the lamp to 0, the direction of radiation of the lamp is fixed to the straight ahead direction of the motor vehicle in the state of crawling, or being halted or parked, or putting into a garage, whereby the area in the vicinity of the motor vehicle is illuminated in the stable state without dazzling the motor vehicles or the pedestrians passing nearby, and unpleasant feeling due to a large deflection of the direction of radiation of the headlamp may be prevented. On the other hand, when the vehicle is in the cruising state at almost high speed, the maximum deflection angle of the lamp is suppressed with increase in vehicle speed, and thus the deflection angle of the lamp is controlled within the range around the straight ahead direction of the vehicle. Therefore, the area around the straight ahead direction at the corresponding distance in the traveling direction of the vehicle can be illuminated irrespective of the steering state of the vehicle, and large lateral fluctuation of the direction of radiation of the lamp may be prevented. When the speed decreases gradually, the restraints on the maximum deflection angle is alleviated and thus the area immediately in front of the vehicle in the traveling direction may be illuminated correctly even on the curved road. In addition, since the maximum deflection angle signal is limited in accordance with reduction in vehicle speed in the transitional traveling state, continuity of variations in the maximum deflection angle between the halted state and the cruising state may be maintained, and thus sudden changes of the direction of radiation of the lamp at the time of stop and departure may be prevented so as not to give fear of insecurity to the occupant.

What is claimed is:

1. A vehicle lighting apparatus comprising:

a steering angle sensor for detecting a steering direction of a vehicle;

lamp deflection angle controlling means for controlling a deflection angle of a direction of radiation of a lamp based on an output from said steering angle sensor; and a vehicle speed sensor for detecting a traveling speed of the vehicle, wherein said lamp deflection angle controlling means controls a maximum deflection angle of the lamp based on the traveling speed detected by said vehicle speed sensor, and wherein the maximum deflection angle decreases with increase in the traveling speed when the vehicle is in a cruising state at a prescribed speed or more.

2. The vehicle lighting apparatus according to claim 1, wherein said lamp deflection angle controlling means sets the maximum deflection angle to 0° when the vehicle is almost in a state of coming to stop.

3. The vehicle lighting apparatus according to claim 2, wherein said lamp deflection angle controlling means increases the maximum deflecting angle with increase in the traveling speed when the vehicle is in a transitional traveling state between the state of almost coming to stop and the cruising state.

4. The vehicle lighting apparatus according to claim 1 wherein, when the vehicle is in a cruising state of at least the prescribed speed, the maximum deflection angle decreases as the traveling speed increases through a range of continuously increasing speeds.

* * * * *